H. A. JUKES.

DRY CLOSET OR COMMODE.

No. 11,373. Reissued Oct. 10, 1893.

Witnesses.

Wm. R. Morris

Frank D. Merchant

Inventor:

Hamilton Agustus Jukes

By his attorney

Jas. F. Williamson

UNITED STATES PATENT OFFICE.

HAMILTON AUGUSTUS JUKES, OF WINNIPEG, CANADA.

DRY CLOSET OR COMMODE.

SPECIFICATION forming part of Reissued Letters Patent No. 11,373, dated October 10, 1893.

Original No. 479,712, dated July 26, 1892. Application for reissue filed February 10, 1893. Serial No. 461,839.

*To all whom it may concern:*

Be it known that I, HAMILTON AUGUSTUS JUKES, a subject of Her Majesty the Queen of England, residing at Winnipeg, in the Province of Manitoba, Dominion of Canada, have invented a new and useful Dry Closet or Commode, of which the following is a specification.

My invention relates to improvements in dry earth or ashes closets, whereby the use of earth or ashes after each stool may be dispensed with; but to insure cleanliness and ease in emptying excrement care should be taken to place some dry earth or ashes in excrement-bucket before using, all odor and foul gases being carried off by a free current of air passing through closet at all times.

This closet can be set up in any room in a house having a chimney-hole or stovepipe passing through it and is readily movable from one room to another at any time. I attain this object by the mechanism illustrated in the accompanying drawings, in which—

Figure 1:
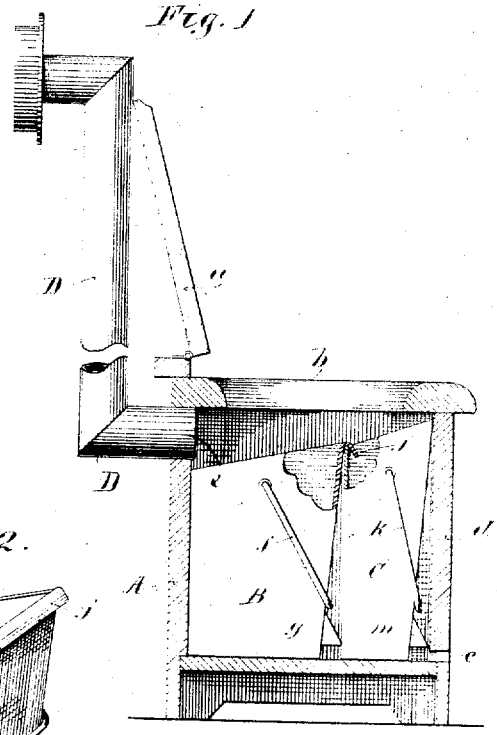
Figure 2:
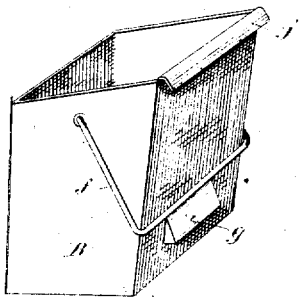
Figure 3:
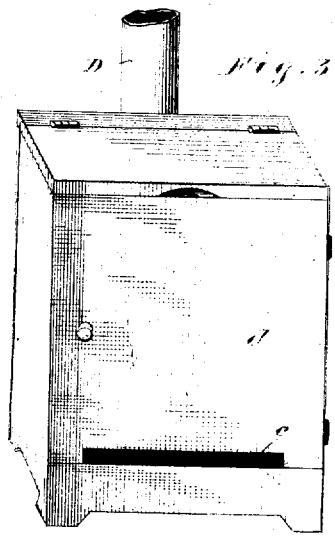

Figure 1 is a vertical section of device embodying my invention. Fig. 2 is a perspective view of bucket B. Fig. 3 is a perspective view of dry closet or commode closed.

Similar letters refer to similar parts throughout the several views.

A is a box having top or seat *b*, with suitable opening.

*a* is a hinged lid or cover.

*d* is a hinged door having an aperture *c*, as shown.

*e* is an opening in rear of box above bucket B, through which enters the pipe D, which pipe is to be connected with any stovepipe or chimney-hole in order to create a draft.

B is a bucket for excrement, having an overhanging lip or turn-over *j*, handle *f*, and lug or pull *g*. C is a bucket for urine, having handle *k* and lug or pull *m*. These buckets fit snugly into box, leaving room for air to pass all around front and sides and out over top, B having a curled lip, under which C slips, preventing any leakage between, both buckets being higher in front than in rear and sloping gradually back from top of front of closet to just below hole *e*, where pipe D enters, both buckets being narrower at bottom than at top, thus allowing space for handle *f* and lug *g* between buckets, always insuring cleanliness, urine-bucket C being purposely made high in front in order to prevent any escape of urine, door *d* when latched fitting close up against bucket at top and lug *m* at bottom, always forcing buckets into position and retaining them there.

The separation of the excrement and urine, effected by the use of two buckets, prevents the production of the large volume of gases, which would otherwise be formed by the mixture. This separation, therefore, greatly reduces the work of ventilation. Hence, the comparatively small volume of gases and foul odors from the separated matter may be readily carried off by the excess draft available from even a small stove pipe or flue, without materially interfering with the fire.

The fact that the mouth of the draft pipe D is at the rear or the stove-box A and near the seat level, and that the buckets B, C, are of unequal height with rearwardly sloping mouths, working, as shown, with the urine or higher bucket in front of the lower or excrement bucket, affords an increasing rearward clearance for the gases and air moving toward the draft-pipe. This insures the direct outflow of the gases and air into the draft-pipe. It also enables the front margin of the urine bucket C to be extended upward close to the under surface of the seat rim, for preventing the escape of the urine at that point, without interfering with the rearward escape of the gases. These are important features of the construction, in a practical point of view.

The fact that the buckets are narrower at their bottoms than at their tops, from front to rear; or otherwise stated, have forwardly flaring walls insures a close joint between the meeting margins of the bucket mouths and affords an air space between the bodies of the two buckets and between the front wall of the box and the front wall of the front bucket.

The handles *f*, located as shown, serve as spacing devices to hold the sides of the buckets out of contact with the sides of the box, thus affording an air-space at the sides of the buckets. In virtue of these features of construction, for spacing the buckets and the unequal heights and the rearwardly sloping tops of the buckets, air entering through the inlet *c*, is bound to completely envelop the front and sides of the buckets and pass over the open mouths of the same, in its course to the draft-pipe.

The relative sizes of the box A and the buckets B C and the action of the door, *d*, on the buckets, insure the accurate positioning of the buckets, so that there can be no discharge into the box.

Experience has demonstrated that a commode constructed as herein shown and described will not permit the escape of any odors or gases into the room, but on the contrary, will so thoroughly exhaust the same into the stovepipe or chimney that the buckets only need be emptied when completely filled.

What I claim as my invention, and desire to secure by Letters Patent, is—

1. The portable ventilated commode, comprising the close lidded stool-box, having the pivoted front wall or door and provided with a draft-pipe and air inlet, the pair of forwardly flaring buckets of unequal height, having rearwardly sloping mouths, working the higher in front of the lower, closely fitting the box and provided with spacing devices at their sides, the said buckets being removable through and adapted to be locked into their proper working position by said pivoted wall or door, substantially as described.

2. The combination, in a dry closet or commode, of the box A, with the opening *e* in rear, the seat *b*, with suitable opening, hinged lid *a*, hinged door *d*, with aperture *c* in or below the door, the bucket B, with overhanging lip *j*, handle *f*, and lug *g*, the bucket C, with handle *k* and lug *m*, and the pipe D, entering dry closet through aperture *e* to connect with stovepipe or flue, substantially as set forth.

In testimony whereof I affix my signature in the presence of two witnesses.

HAMILTON AUGUSTUS JUKES.

Witnesses:

G. VIDAL SALTER,

C. H. KIRK.